US009441387B1

(12) United States Patent
Seldin

(10) Patent No.: US 9,441,387 B1
(45) Date of Patent: Sep. 13, 2016

(54) BUILDING STRUCTURE INCLUDING ADAPTABLE ENCLOSURES

(71) Applicant: Novus Residences LLC, Washington, DC (US)

(72) Inventor: Robert M. Seldin, Arlington, VA (US)

(73) Assignee: Novus Residences LLC, Washington, DC (US)

( * ) Notice: Subject to any disclaimer, the term of this patent is extended or adjusted under 35 U.S.C. 154(b) by 0 days.

(21) Appl. No.: 14/683,675

(22) Filed: Apr. 10, 2015

(51) Int. Cl.
*E04H 1/00* (2006.01)
*E04B 1/343* (2006.01)
*E04H 1/06* (2006.01)

(52) U.S. Cl.
CPC ............. *E04H 1/00* (2013.01); *E04B 1/34315* (2013.01); *E04H 1/06* (2013.01)

(58) Field of Classification Search
CPC ........ E04H 1/00; E04H 1/06; E04H 1/34315
See application file for complete search history.

(56) References Cited

U.S. PATENT DOCUMENTS

| 3,348,344 | A | * | 10/1967 | Tatevossian | E04B 1/34315 52/22 |
|---|---|---|---|---|---|
| 4,928,452 | A | * | 5/1990 | Sacks | E04H 1/00 52/236.3 |
| 5,671,570 | A | * | 9/1997 | Kaufman | E04H 1/00 52/169.2 |
| 6,405,496 | B1 | * | 6/2002 | Stewart | E04H 6/10 52/169.3 |
| 7,036,276 | B1 | * | 5/2006 | Apel | E04H 1/02 52/169.2 |
| 2003/0140571 | A1 | * | 7/2003 | Muha | A47K 4/00 52/79.1 |
| 2007/0074471 | A1 | * | 4/2007 | Gallagher | E04H 3/02 52/236.3 |
| 2007/0260473 | A1 | * | 11/2007 | Cornacchia | E04H 1/04 705/313 |
| 2009/0031642 | A1 | * | 2/2009 | Donovan | E04B 1/3444 52/79.1 |
| 2009/0139166 | A1 | * | 6/2009 | Zwimpfer | E04H 1/04 52/236.3 |
| 2015/0132082 | A1 | * | 5/2015 | Goshi | A47B 85/08 414/10 |

* cited by examiner

*Primary Examiner* — Joshua J Michener
*Assistant Examiner* — Keith Minter
(74) *Attorney, Agent, or Firm* — Sughrue Mion, PLLC

(57) ABSTRACT

A building structure and a method for incorporating flexibility of intended use into the building are disclosed. The building structure includes a plurality of enclosures which are individually permitted for use as either of a residence or commercial space, or as a combined live/work space. Each of the plurality of enclosures is compliant with the applicable legal requirements for use as either of a residence or a commercial space, including the applicable local zoning requirements. The enclosures may include movable interior walls which are designed to facilitate conversions between residential use and commercial use.

6 Claims, 6 Drawing Sheets

BUILDING STRUCTURE INCLUDING ADAPTABLE ENCLOSURES

BACKGROUND

1. Field

Exemplary embodiments relate to building structures, and more particularly, to building structures which include units which are permitted and usable for any of residential use, commercial use, and/or live/work use at all times.

2. Description of the Related Art

Historically, buildings have been constructed based on a particular and specific intended use of the building. In particular, buildings have typically been intended for either commercial use, i.e., as a place of business or as an office, or for residential use, i.e., as a single-family home or an apartment building.

State and local governments have established codes and regulations which are applicable to buildings, largely based on whether the building is intended for residential use or commercial use. In addition, zoning regulations are ubiquitous, and as a result, some geographic areas are set aside strictly for either exclusive residential use or exclusive commercial use, and other areas are zoned for mixed commercial and residential use, which normally entails sequestering of different uses within different buildings or within rigidly defined locations in the same building.

A combination of changes in work styles facilitated by technological innovation, an increasing propensity of people to work from home, and growing entrepreneurship combined with the economic slowdown that occurred in the latter part of the first decade of the 2000's have rendered a significant number of existing office buildings vacant and facing an uncertain economic future.

In response to the significant increase in structural vacancy of office buildings, and in recognition of changing living and working styles that encourage both entrepreneurship and people to "work from home," a need has emerged for adapting office buildings to accommodate these trends in ways that expand traditional use categories and thereby increase market demand. Historically, adapting an office building for residential use has entailed a cumbersome entitlement process, while the retrofitting process has been complicated by traditional housing layouts that were not consistent with either the dimensions or attributes of buildings designed to accommodate commercial places of business. As a result of these complications, the cost for such retrofitting has typically been prohibitive.

Accordingly, a need for providing flexibility in the intended use of space in buildings and an ability to convert an intended use relatively easily and affordably has been recognized.

SUMMARY

Therefore, it is an aspect of one or more exemplary embodiments to provide a building structure which includes enclosures which are designed for flexibility and adaptability with respect to intended use, and for ease and reduced cost in conversions between intended uses.

In an aspect, a building structure is provided. The building structure includes a plurality of enclosures which are individually usable at all times either as a residence or as a commercial space, or as a "live/work" space; at least one hallway; and office code compliant publicly accessible restroom facilities. Each of the plurality of enclosures is accessible from at least one hallway. Each of the plurality of enclosures is compliant with the applicable legal requirements for both residential use and commercial use.

The at least one publicly accessible bathroom may be compliant with the applicable requirements of the Americans with Disabilities Act (ADA).

Each of the plurality of enclosures may include at least one kitchen which is designed for residential use and at least one bathroom which is designed for residential use.

Each of the plurality of enclosures may include at least one moveable interior wall which is configured for movement such that when the at least one moveable interior wall within a particular enclosure is moved, a corresponding room layout of the particular enclosure changes based on an amount of movement and an orientation of the at least one moveable interior wall.

Each of the plurality of enclosures may be compliant with the applicable zoning requirements for use as either of a residential space or a commercial space.

Each of the plurality of enclosures may include a respective plurality of electrical outlets, fixtures and pre-wired junction boxes which are arranged based on the applicable legal requirements for both residential and commercial use.

Each of the plurality of enclosures may include a respective plurality of running water sources which are arranged based on the legal requirements.

At least a first one of the plurality of enclosures may be utilized as a residence, and at least a second one of the plurality of enclosures may be utilized as a commercial space.

The building structure may include at least two floors. Each floor may include a subset of the plurality of enclosures, at least one hallway, and at least one publicly accessible bathroom.

The building structure may be a subject of one or more certificates of occupancy issued by a governing jurisdiction. The certificates of occupancy may include an indication that the building structure is usable for both commercial use and residential use.

In another aspect, a method for constructing a building is disclosed. The method includes providing a plurality of enclosures which are individually adaptable for use as a residence or as a commercial space at all times; providing at least one hallway; and providing at least one publicly accessible bathroom. Each of the plurality of enclosures is accessible from the at least one hallway. Each of the plurality of enclosures is compliant with the applicable legal requirements for both residential use and commercial use.

The at least one publicly accessible bathroom may be compliant with the applicable requirements of the Americans with Disabilities Act (ADA) to comply with commercial requirements for office occupancy.

Each of the plurality of enclosures may include at least one kitchen which is designed for residential use and at least one bathroom which is designed for residential use.

The method may further include moving a moveable interior wall which is included within a first enclosure of the plurality of enclosures such that a corresponding room layout of the first enclosure changes based on an amount of the moving and an orientation of the moveable interior wall which results from the moving.

The method may further include ensuring that each of the plurality of enclosures is compliant with the applicable zoning requirements for use as either of a residential space or a commercial space.

The method may further include providing, for each of the plurality of enclosures, a respective plurality of electrical outlets, fixtures and pre-wired junction boxes which are arranged based on the legal requirements.

The method may further include providing, for each of the plurality of enclosures, a respective plurality of running water sources which are arranged based on the legal requirements.

The method may further include adapting at least a first one of the plurality of enclosures for use as a residence, and adapting at least a second one of the plurality of enclosures for use as a commercial space.

The building may include at least two floors. Each floor may include a subset of the plurality of enclosures, at least one hallway, and at least one publicly accessible bathroom.

The building may be a subject of one or more certificates of occupancy issued by a governing jurisdiction. The certificates of occupancy may include an indication that the building structure is usable for both commercial use and residential use.

In yet another aspect, a method for converting an office building into a building designed for hybrid commercial use and residential use is provided. The office building includes at least one floor, and each floor includes a respective plurality of enclosures, at least one hallway, and code compliant publicly accessible restroom facilities. The method includes providing each enclosure with a kitchen designed for residential use and at least one bathroom designed for residential use, ensuring that each enclosure is compliant with the applicable legal requirements for both residential use and commercial use, and receiving one or more certificates of occupancy for the converted building which is issued by a governing jurisdiction. The certificates of occupancy may include an indication that the converted building is usable for both commercial use and residential use. Alternatively, specific certificates of occupancy may be issued for each individual unit enclosure for the specific type of use (i.e., residential or commercial) desired by the occupant such that each certificate of occupancy may be modified to accommodate future users with different types of occupancy.

The method may further include ensuring that the at least one publicly accessible bathroom included in each of the at least one floor, or as is otherwise required, and is compliant with the applicable requirements of the Americans with Disabilities Act (ADA).

The method may further include ensuring that each enclosure included in each of the at least one floor is compliant with all zoning requirements for both residential use and commercial use.

BRIEF DESCRIPTION OF THE DRAWINGS

These and/or other aspects of the disclosure will become apparent and more readily appreciated from the following description of exemplary embodiments, taken in conjunction with the accompanying drawings of which.

DETAILED DESCRIPTION

Figure 1:
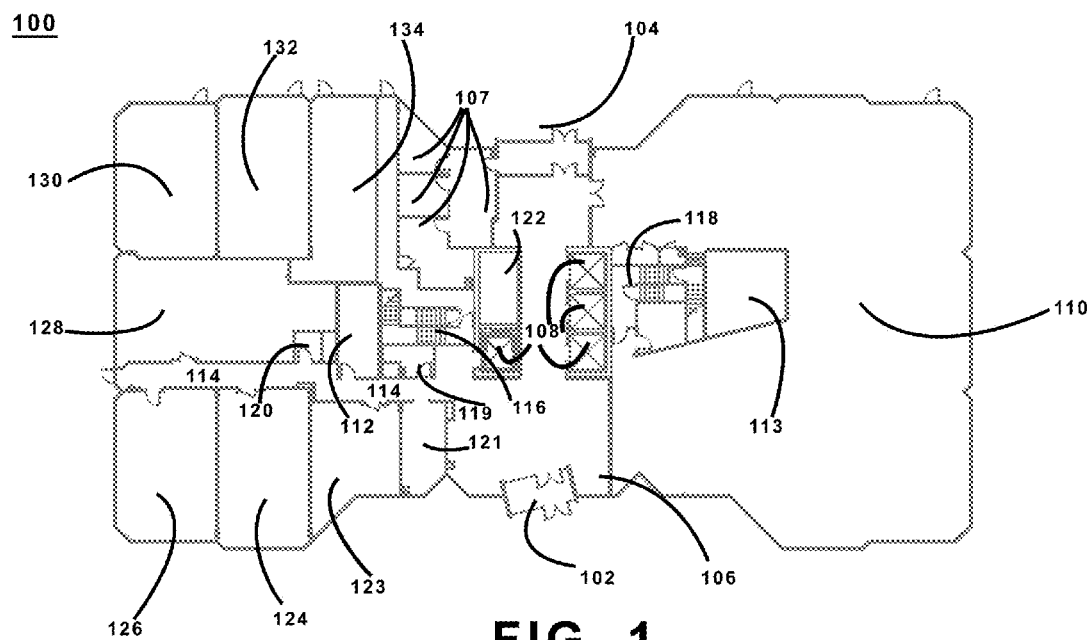
FIG. 1 is a floor plan of a first floor of a building structure, according to an exemplary embodiment.

There are numerous reasons why flexible-use buildings and flexible-use enclosures within buildings have not been constructed in the past. Firstly, there have typically been significant legal obstacles to overcome, many of which entail a significant cost. In particular, zoning requirements are specifically bifurcated between business uses and residential uses. Even in areas which are zoned for "mixed" use, there are different rules as between specific units which are designated for business use and specific units which are designated for residential use, and the "mixed" category refers to an integration of the two separate types of units within a particular geographic area, not to a flexibility of use for a particular unit.

Secondly, the real estate development industry is not organized in a way that facilitates flexible-use units. In particular, for reasons of efficiency and profitability, most professional persons that are employed in this industry typically focus on either commercial real estate or residential real estate, and the overlap is quite minimal. There has historically been a significant bifurcation and discretization as between these two major sectors of real estate, and this bifurcation is reflected in industry standards and in all aspects of legal and legislative regulation. The bifurcation is also manifested in auxiliary industries, such as, for example, the real estate brokerage industry, in which most sales professionals may become expert in either residential real estate or commercial real estate, but rarely in both areas. For a real estate broker, a flexible-use unit does not exist as a classification, and therefore, few professionals cross over between these areas. The same is true for the real estate property management and asset management sectors as well, where industry cross-over is rare.

Thirdly, building codes which have been enacted over many decades are quite different as between business use and residential use. Building codes generally relate to occupant safety, and cover all physical aspects of a building construction. Examples include codes relating to shear requirements, dead load requirements, live load requirements, rebar/structural reinforcement requirements, and fire code requirements. As a direct result, the cost associated with each set of building codes is significant. For this reason, there is a major financial cost associated with compliance with both sets of building codes, and a correspondingly major disincentive to make an attempt to satisfy both sets of building codes for a given construction which is envisioned as being intended for either business or residential use.

Fourthly, political considerations have also had an effect of discouraging flexibility of usage in real estate. Land use has always had an inherently political aspect, and control over land has historically been closely associated with power and wealth. In this aspect, publicly elected officials have tended to shy away from the uncertainties associated with the notion of flexible-use building construction, because an unintended negative consequence could result in a negative political consequence for the officials involved therein. The political desire to avoid uncertainty has manifested itself, for example, in the specificity of zoning regulations.

Lastly, the real estate finance and lending industries have long been bifurcated along commercial and residential lines in both equity and debt financing. Due to the normally divergent lease durations between both product types, differences in average square footage per lease, tenant improvement allowances in commercial leasing that do not exist in residential leasing and the inherent types of risk associated with both commercial and residential tenancy, the financial markets have developed industry-specific lending practices and risk-based market valuation metrics that govern lending requirements and targeted equity return thresholds for each sector. Product and risk based differences between commercial and residential assets reveal themselves in lending practices with divergent loan maturities, loan terms, loan rates, loan to cost and loan to value ratios and the willingness of the U.S. Federal Government to provide loan subsidies for residential properties that are not available in the commercial sector.

Reference will now be made in detail to exemplary embodiments, examples of which are illustrated in the accompanying drawings, wherein like reference numerals refer to like elements throughout.

In the following description of the exemplary embodiments, certain detailed explanations of related art are omitted when it is deemed that they may unnecessarily obscure the essence of the invention. It will be understood that although the terms "first", "second", etc. may be used herein to describe various components, these components should not be limited by these terms. These components are only used to distinguish one component from another.

In the following description, the word "unit" refers to a real estate entity which is embodied as a physical enclosure within a building, and which is typically occupied by a tenant and/or owner of the "unit." For example, a "residential unit" is synonymous with an apartment or condominium, and a "commercial unit" is synonymous with an office space.

Hereinafter, exemplary embodiments will be described in detail with reference to the accompanying drawings.

Figure 2:
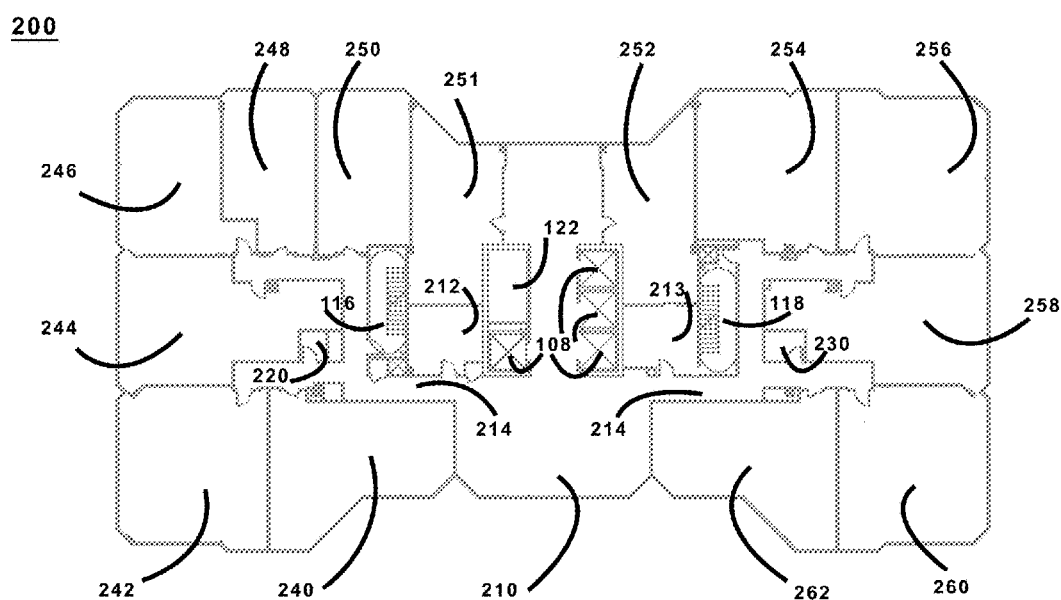
FIG. 2 is a floor plan of a second floor of a building structure, according to an exemplary embodiment.
Figure 3:
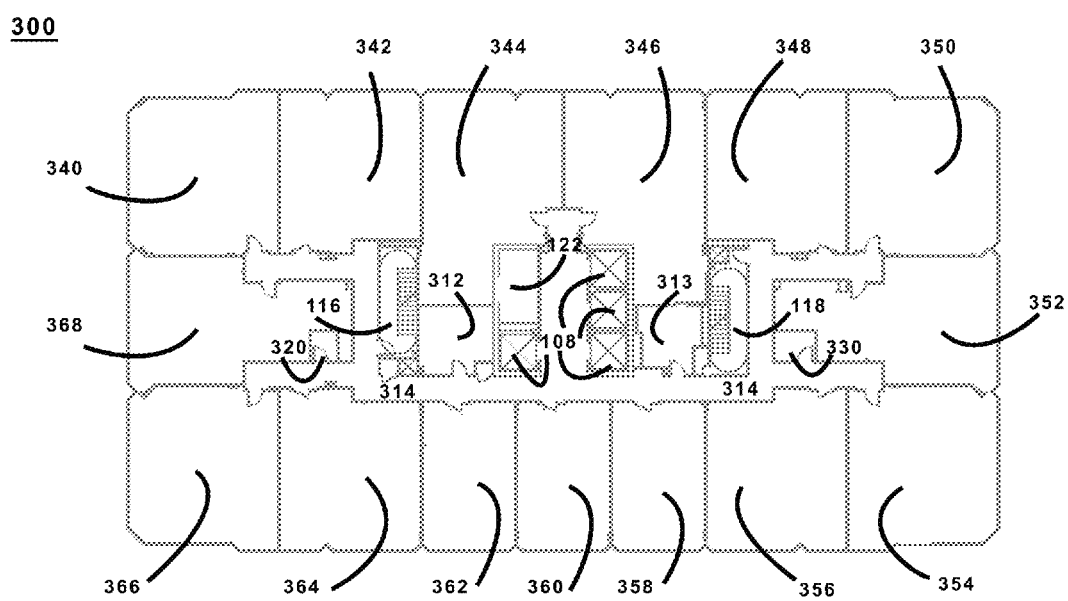
FIG. 3 is a floor plan of an upper floor of a building structure, according to an exemplary embodiment.

FIG. 1 is a floor plan of a first floor of a building structure, according to an exemplary embodiment. FIG. 2 is a floor plan of a second floor of a building structure, according to an exemplary embodiment. FIG. 3 is a floor plan of an upper floor of a building structure, according to an exemplary embodiment Referring to FIG. 1, a building structure according to an exemplary embodiment is based on an existing office building and includes at least three floors. The first floor 100 includes a front entrance 102, a back entrance 104, a lobby 106, a leasing office suite 107, an elevator bank 108, a first-floor amenity area 110, a publicly accessible men's bathroom 112, a publicly accessible women's bathroom 113, a first-floor hallway 114, a first stairway 116, a second stairway 118, an electrical room 119, a first-floor trash room 120, a mail room 121, a mechanical shaft 122, and a plurality of enclosures 123, 124, 126, 128, 130, 132, and 134.

Referring to FIG. 2, the second floor 200 includes a second-floor hallway 214, a second-floor amenity area 210, the elevator bank 108, the first stairway 116, the second stairway 118, a second-floor trash room 220, the mechanical shaft 122, a publicly accessible men's bathroom 212, a publicly accessible women's bathroom 213, an electrical room 230, and a plurality of enclosures 240, 242, 244, 246, 248, 250, 251, 252, 254, 256, 258, 260, and 262.

In an exemplary embodiment, each of the first-floor amenity area 110 and the second-floor amenity area 210 may be usable for any of a variety of potential purposes. Examples of potential uses of an amenity area include the following:

1) Lobby;
2) Package room/Delivery room;
3) Meeting room;
4) Conference room;
5) Family table space;
6) Lounge (e.g. television lounge, game room, party room);
7) Private booth space;
8) Kitchen café/Eatery;
9) Media room;
10) Fitness center;
11) Leasing center;
12) Flexible conference space;
13) Copy center;
14) Pet grooming area; and
15) Music practice facility Other potential uses for an amenity area are also possible.

Referring to FIG. 3, the third floor 300 includes a third-floor hallway 314, the elevator bank 108, the first stairway 116, the second stairway 118, a trash room 320, the mechanical shaft 122, a publicly accessible men's bathroom 312, a publicly accessible women's bathroom 313, an electrical room 330, and a plurality of enclosures 340, 342, 344, 346, 348, 350, 352, 354, 356, 358, 360, 362, 364, 366, and 368. In an exemplary embodiment, the building may include additional floors, and each of the additional floors may have a floor plan which is similar or identical to the floor plan illustrated in FIG. 3.

In an exemplary embodiment, the building structure illustrated in FIGS. 1, 2, and 3 is based on an office building which is compliant with all applicable state and local rules and regulations for commercial use. In particular, for example, unlike most buildings designed for residential use, each floor includes publicly accessible bathrooms for men and women which are compliant with the applicable requirements of the Americans with Disability Act (ADA).

More particularly, the building and each enclosure are designed to ensure compliance with numerous legal requirements, including the following:

1) Zoning compliance that enables multiple use occupancy of each space/enclosure;
2) Presence of "handicapped" bathrooms for each sex (i.e., for men and for women) in common hallways on each floor, or every other floor as codes may dictate or allow;
3) Presence of required fixtures, including lighting fixtures and electrical fixtures, in common hallways and in each unit, on each floor, per the more restrictive occupancy requirements;
4) Presence of kitchens, bathrooms, and laundry facilities in each enclosure in order that each enclosure is feasible for residential use;
5) Compliance with safety requirements which pertain to multiple use occupancy, also referred to herein as "Life Safety" requirements, such as, for example, fire safety requirements (including smoke alarms and sprinkler systems), ventilation requirements (i.e., number of air exchanges), and signage requirements (i.e., posting of illuminated "Exit" signs in enclosures and in common hallways); and
6) Compliance with the Americans with Disabilities Act (ADA), including building accessibility requirements (e.g., wheelchair access).

In an exemplary embodiment, the Life Safety requirements which pertain to residential use may be more stringent than analogous Life Safety requirements which pertain to commercial use, because safety considerations relating to residential use are generally based on potential 24-hour-per-day usage and occupancy by residents that are likely to be asleep at some times. For example, fire ratings of interior demising walls that separate individual units from one another and that separate individual units from the common corridor are generally higher for residential units than for commercial units, as they are likewise for sound transmission. Other examples include occupant load (i.e., minimum number of square feet per occupant), maximum travel distance, and means of egress.

Regarding ventilation requirements, office occupancy requirements generally require that windows are non-operable, and therefore, in an exemplary embodiment, outside air will be piped into each individual unit. In an exemplary embodiment, ionized air filtration may be provided in each enclosure, regardless of whether ionized air filtration (or air filtration of any kind) is required for compliance with code regulations. In an exemplary embodiment, at least one elevator which is able to accommodate a stretcher (i.e., a stretcher-compliant elevator) may be provided.

In an exemplary embodiment, additional features may be provided regardless of whether the features are required for compliance with code regulations. For example, exterior walls for each enclosure may be constructed based on a predetermined acoustic standard, in order to ensure a desired level of sound transmission. As a second example, kitchen ranges in each enclosure may be configured to be exhausted to the exterior of the building. As a third example, trash and recycling chutes may be provided and configured for residential use. As a fourth example, parking lots and/or parking decks may be provided at the exterior of or beneath the building and based on office use standards that are typically more intensive than residential parking requirements.

In an exemplary embodiment, the legal requirements may be determined based on any one or more of federal, state, and local (i.e., county, city, town) laws, rules, and regulations, and/or other sources, such as, for example, International Building Code (IBC), International Existing Building Code (IEBC), International Plumbing Code (IPC), International Mechanical Code (IMC), National Fire Protection Association (NFPA) codes and standards, International Fuel Gas Code (IFGC), International Energy Conservation Code (IECC), International Residential Code (IRC), American National Standards Institute (ANSI) standards, and/or any other codes which may be applicable in the jurisdiction within which a property resides.

Figure 4:
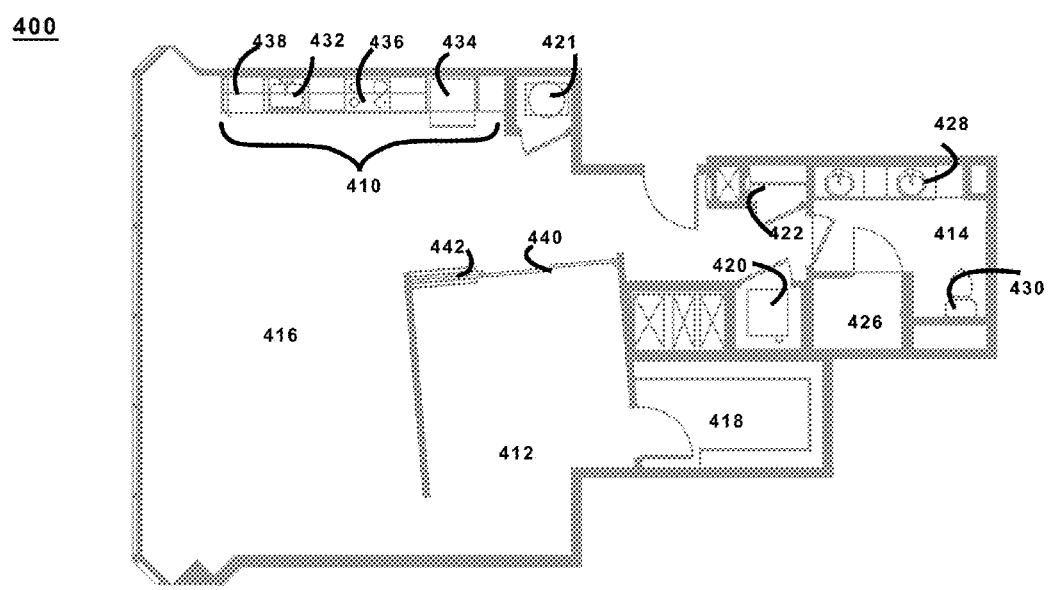
FIG. 4 is a floor plan of a first exemplary enclosure within a building structure, according to an exemplary embodiment.
Figure 5:
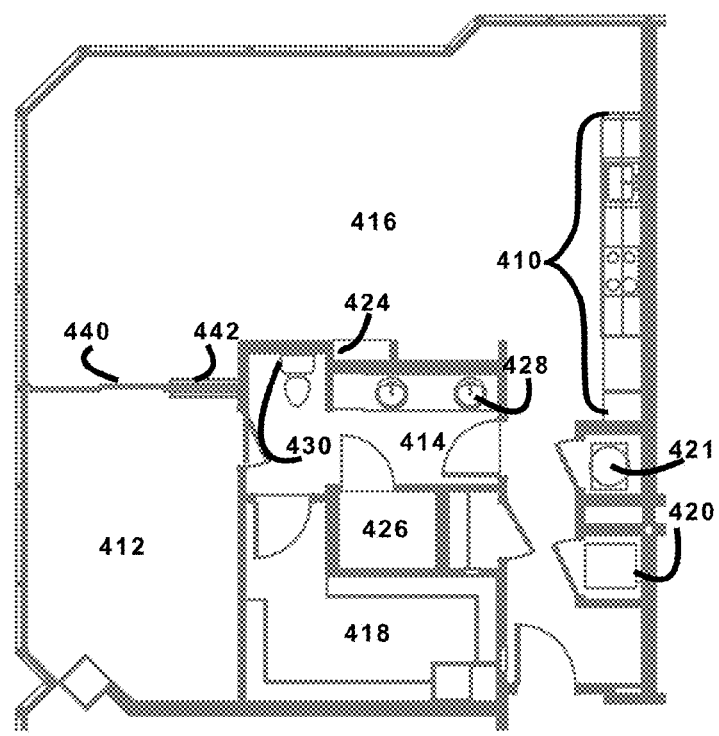
FIG. 5 is a floor plan of a second exemplary enclosure within a building structure, according to an exemplary embodiment.

FIG. 4 is a floor plan of a first exemplary enclosure 400 within a building structure, according to an exemplary embodiment. FIG. 5 is a floor plan of a second exemplary enclosure 500 within a building structure, according to an exemplary embodiment.

Referring to FIG. 4, an enclosure 400 includes a kitchen 410, a living room/dining room area 416, a bedroom 412, and a bathroom 414. The enclosure also includes various amenities which are designed for residential use, such as, for example, a walk-in closet 418, a washer/dryer area 420, a mechanical room 421, and a coat closet 422. The bathroom 414 also includes a plurality of running water sources and amenities which are designed for residential use, such as, for example, a large shower stall 426, a double-basin sink (i.e., double vanity) 428, and a unisex toilet fixture 430.

The kitchen 410 includes features which are required for residential use, such as, for example, a sink 432 which is equipped with an automatic disposal, a full refrigerator 434, a freezer with an ice cube maker, a stovetop range 436, an oven, an automatic dishwasher 438, countertop space, and cabinets. In an exemplary embodiment, a microwave oven may be included, and a pantry may be included.

The living room/dining room area 416 includes fixtures which are suitable for residential use, such as, for example, electrical outlets which are usable for providing electrical power to a variety of electrically powered appliances and objects, one or more telephone jacks, one or more television outlets, and connectors for providing Internet service. Further, the living room/dining room area 416 also includes lighting fixtures, such as, for example, any one or more of overhead lighting which is recessed into the ceiling, pendant lighting, and a chandelier lighting fixture.

The bedroom 412 includes at least one sliding door panel 440 which is configured to be movable into a fixed wall structure 442, so that in the event that the enclosure is being adapted for commercial use and it is desired that the bedroom 412 become openly accessible to persons who are working within the enclosure, the sliding door panel 440 can be opened. Alternatively, if the enclosure 400 is being adapted for residential use and the resident desires to enclose the bedroom 412 within the enclosure space, the sliding door panel 440 can be closed to form a physical barrier between the bedroom 412 and the living room/dining room area 416. The bedroom 412 may also be enclosed with respect to the remainder of the enclosure 400 by using interior walls which are thicker than other interior walls for noise reduction and/or for providing stability for structures which are attachable to a wall, such as artwork and a television bracket.

When adapted for use as office space, in an exemplary embodiment, the living room may be considered the "office worker area" and may be populated with desks and other accoutrements of office work; the bedroom may function as a private office or as an additional office worker area; and the walk-in closet may function as a copy and file room. When adapted for use as a live/work space, where the work function may be required to occupy no more than 50% of the total floor area of the individual unit, in an exemplary embodiment, the "office" floor area may be either the living room or bedroom, and the "living" floor area may be the remaining space within the unit that is not designated as "office" floor area.

Referring to FIG. 5, an alternative floor plan for an enclosure 500 is provided. Similarly as in FIG. 4, the enclosure 500 includes a kitchen 410, a living room/dining room area 416, a bedroom 412, and a bathroom 414, and the enclosure 500 also includes various amenities which are designed for residential use, such as, for example, a walk-in closet 418, a washer/dryer area 420, a mechanical room 421, and a set of built-in shelves 424. The bathroom 414 also includes amenities which are designed for residential use, such as, for example, a shower stall 426, a double-basin sink 428, and a unisex toilet fixture 430. However, the spatial layout of these items varies significantly from the layout of the items shown in FIG. 4.

The bedroom 412 includes at least one sliding door panel 440 which is configured to be movable into a fixed wall structure 442, so that in the event that the enclosure is being adapted for commercial use and it is desired that the bedroom 412 become openly accessible to persons who are working within the enclosure 500, the sliding door panel 440 can be opened. Alternatively, if the enclosure 500 is being adapted for residential use and the resident desires to enclose the bedroom 412 within the enclosure space, the sliding door panel 440 can be closed to form a physical barrier between the bedroom 412 and the living room/dining room area 416.

When adapted for use as office space, in an exemplary embodiment, the living room may be considered the "office worker area" and may be populated with desks and other accoutrements of office work; the bedroom may function as a private office or as an additional office worker area; and the walk-in closet may function as a copy and file room. When adapted for use as a live/work space, where the work function may be required to occupy no more than 50% of the total floor area of the individual unit, in an exemplary embodiment, the "office" floor area may be either the living room or bedroom, and the "living" floor area may be the remaining space within the unit that is not designated as "office" floor area.

The enclosures 400 and 500 are designed for flexibility with respect to intended use as any of a work space (i.e., a commercial use or office), a residential space, and a "live/work" space. In this aspect, each enclosure is simultaneously compliant with the applicable legal requirements for both commercial use and residential use, and the building is also simultaneously compliant with the applicable legal requirements for both commercial use and residential use. In addition, in an exemplary embodiment, each enclosure includes a continuity of open space, at least one movable partition, and a linear kitchen, thereby maximizing flexibility in intended use.

In an exemplary embodiment, enclosures may include additional features which are deemed as being desirable for residential use, regardless of whether such features are required for compliance with applicable rules and regulations. For example, the enclosures may include any one or more of the following features:
1) Exterior glass walls;
2) Upscale kitchen fixtures and countertops;
3) Large walk-in closets;
4) Bathroom amenities which relate to private use by couples;
5) Large shower stalls;
6) Segregated toilet areas;
7) Customized flooring, e.g., hardwood floors or upscale tiling and/or carpeting;
8) Pantry;
9) Coat closet; and
10) Linen closet.

In an exemplary embodiment, an existing office building which has previously been constructed for commercial use may be converted into a building which is designed for flexibility with respect to both commercial use and residential use. In this aspect, because the existing office building is typically constructed in accordance with all legal requirements for commercial use, the conversion of such a building into a building designed for hybrid commercial and residential use, in accordance with one or more exemplary embodiments, primarily entails ensuring that each enclosure includes all required elements for residential use, such as a kitchen facility, at least one bathroom, and a laundry facility. Alternatively, in accordance with another exemplary embodiment, a new building which is designed for flexibility with respect to any of commercial use, residential use, and live/work use may be constructed "from the ground up," i.e., as a new construction.

Such a conversion may be particularly useful in areas in which there is an existing glut of vacant office buildings which has resulted from a boom-and-bust economic cycle which has occurred in recent years, or simply in response to changing patterns of both living and working that demand more flexible spatial and organizational arrangements. In this aspect, a conversion of existing office buildings for flexibility of use with respect to both commercial use and residential use in accordance with one or more exemplary embodiments as described above satisfies a long-felt need in the real estate marketplace.

In an exemplary embodiment, when a construction of a building has been completed, one or more Certificates of Occupancy will be issued by a local jurisdiction, such as, for example, a city, a county, or state. The Certificates of Occupancy include specific information which relates to the building, including identification information such as a building address and a name of a person or entity that owns the building, and also including information relating to the legally permitted use or usage type for the building, and potentially for the legally permitted usage of each individual unit.

In an exemplary embodiment, Certificates of Occupancy for a building which is designed for flexibility with respect to both commercial use and residential use will indicate that all units within the building are certified at all times for occupancy by both commercial entities and residential entities, or for simultaneous commercial use and residential use as "live/work" space. In an alternative exemplary embodiment, all units within a building may receive separate Certificates of Occupancy, one of which provides legal certification for commercial use of each unit when occupied for office use, and the other of which provides legal certification for residential use of each unit when occupied for residential use. In yet another alternative exemplary embodiment, a third separate Certificate of Occupancy may be issued to cover the "live/work" use.

In this aspect, the number of Certificates of Occupancy for a particular construction may relate to a particular jurisdiction and whether or not a dual (or three-way) usage type of Certificate exists in that jurisdiction. Further, it is noted that in many jurisdictions, inspectors that perform inspections on behalf of the corresponding governmental entity are frequently qualified for either "residential" inspections or "commercial" inspections but not both, and therefore, in these jurisdictions, each inspector is able only to provide a verification for the corresponding type of use.

In an exemplary embodiment, a building and each enclosure within the building complies with the Group B standards for business/commercial usage, as set forth in the International Building Code (IBC) and/or as adapted by a particular local or state jurisdiction. In an exemplary embodiment, a building and each enclosure within the building complies with the Group R standards for residential usage as set forth in the IBC and/or as adapted by the particular jurisdiction. More particularly, a building and each enclosure within the building may comply with the R-2 standards for residential usage as set forth in the IBC and/or as adapted by the particular jurisdiction.

Figure 6:
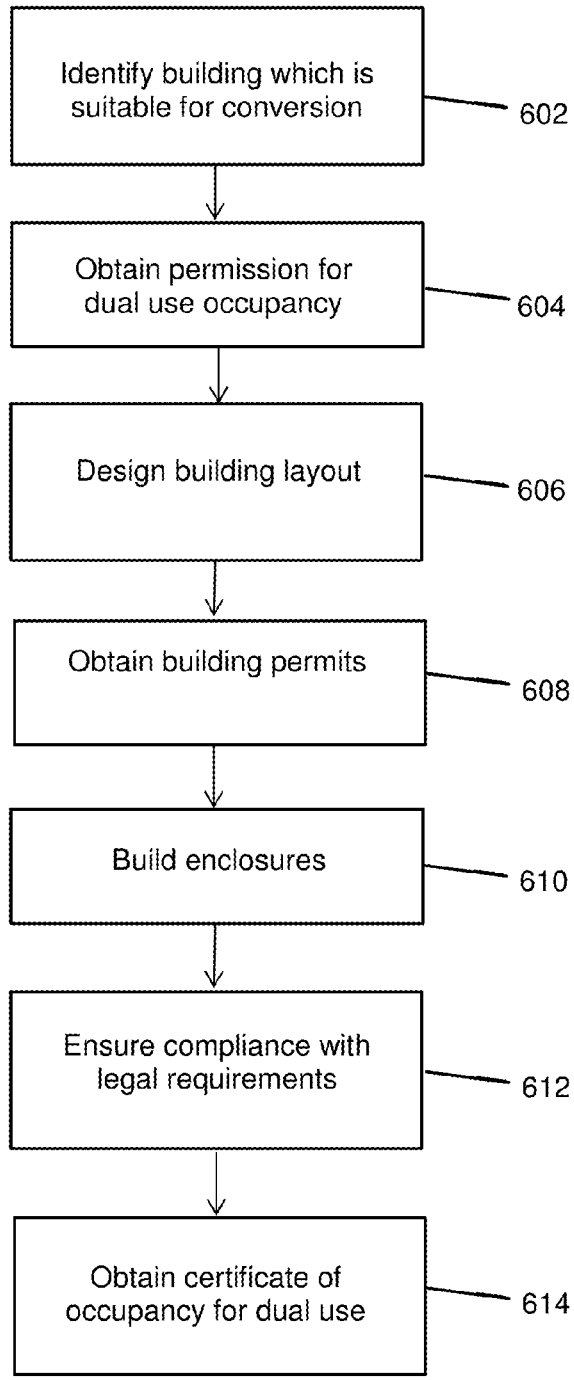
FIG. 6 is a flowchart illustrating a method for converting an office building into a hybrid building designed for flexibility with respect to commercial use and residential use, according to an exemplary embodiment.

FIG. 6 is a flowchart 600 illustrating a method for converting an office building into a hybrid building designed for flexibility with respect to commercial use and residential use, according to an exemplary embodiment.

In the first step 602, a building is identified as being suitable for conversion.

In the second step 604, regulatory permission (i.e., zoning approval) that will enable a structure to maintain dual use occupancy at all times is obtained.

In the third step 606, a building layout is designed. If the conversion entails a renovation of an existing building, the interior layout is designed so as to be consistent with the applicable code requirements.

In the fourth step 608, permits are obtained from the municipality, jurisdiction, state or other relevant governmental entity to construct the improvements. The obtained permits serve as a verification that the designed building layout meets the code requirements.

In the fifth step 610, the enclosures (i.e., units) are constructed in the interior of the building. Each unit includes a kitchen, an interior bathroom, a laundry facility, and any other features which are required and/or desired for flexibility with respect to both commercial use and residential use.

In the sixth step 606, inspections by the municipality or jurisdiction of the completed improvements are performed in order to ensure compliance with all legal requirements for both commercial use and residential use for all units and for the building.

In the seventh step 608, one or more certificates of occupancy for the building are received from a governing body of a local jurisdiction. The certificates of occupancy certify that all units within the building meet relevant code requirements and are usable for both commercial use and residential use. Alternatively, all units within the building may receive two or more separate certificates of occupancy either at one time or sequentially based upon the proposed use of the occupant, such that one certificate certifies that each unit is usable for commercial use, and the other certificate certifies that each unit is usable for residential use.

Although a few exemplary embodiments have been shown and described, it will be appreciated by those of skill in the art that changes may be made in these exemplary embodiments without departing from the principles and spirit of the present inventive concept, the scope of which is defined in the claims and their equivalents.

What is claimed is:

1. A method for constructing a building, comprising:
   providing a plurality of enclosures which are each permitted for use as all of a residence, a commercial space, and a live/work space;
   providing at least one hallway, at least one of the plurality of enclosures being accessible from the at least one hallway;
   providing at least one publicly accessible bathroom; and
   receiving at least one certificate of occupancy for the building which is issued by a governing jurisdiction, wherein the at least one certificate of occupancy includes an indication that each of the plurality of enclosures is usable for all of commercial use, residential use, and live/work use.

2. The method of claim 1, wherein each of the plurality of enclosures includes at least one kitchen which is designed for residential use and at least one bathroom which is designed for residential use.

3. The method of claim 1, further comprising moving a moveable interior wall which is included within a first enclosure of the plurality of enclosures such that a corresponding room layout of the first enclosure changes based on an amount of the moving and an orientation of the moveable interior wall which results from the moving.

4. The method of claim 1, further comprising adapting at least a first one of the plurality of enclosures for use as a residence, and adapting at least a second one of the plurality of enclosures for use as a commercial space.

5. The method of claim 1, wherein the building comprises at least two floors, and wherein each of the at least two floors includes a subset of the plurality of enclosures, at least one of the at least one hallway, and at least one of the at least one publicly accessible bathroom.

6. A method for converting an existing building into a building designed for hybrid commercial use and residential use, the existing building including at least one floor and each of the at least one floor including at least one respective enclosure, at least one hallway, and at least one publicly accessible bathroom, and the method comprising:
   providing each enclosure included in each of the at least one floor with a kitchen designed for residential use and at least one bathroom designed for residential use;
   receiving at least one certificate of occupancy for the converted building which is issued by a governing jurisdiction, wherein the at least one certificate of occupancy includes an indication that at least one enclosure is usable for all of commercial use, residential use, and live/work use.

\* \* \* \* \*